United States Patent
Kawalkar et al.

(10) Patent No.: US 9,733,707 B2
(45) Date of Patent: Aug. 15, 2017

(54) TOUCH SCREEN DISPLAY USER INTERFACE AND METHOD FOR IMPROVING TOUCH INTERFACE UTILITY ON THE SAME EMPLOYING A RULES-BASED MASKING SYSTEM

(75) Inventors: Amit Nishikant Kawalkar, Karnataka (IN); Hans Roth, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 13/427,336

(22) Filed: Mar. 22, 2012

(65) Prior Publication Data
US 2013/0249809 A1    Sep. 26, 2013

(51) Int. Cl.
G06F 3/0488    (2013.01)
G06F 3/01    (2006.01)
G06F 3/0481    (2013.01)

(52) U.S. Cl.
CPC .......... *G06F 3/016* (2013.01); *G06F 3/04812* (2013.01); *G06F 3/04886* (2013.01)

(58) Field of Classification Search
None
See application file for complete search history.

(56) References Cited

U.S. PATENT DOCUMENTS

| | | |
|---|---|---|
| 5,128,672 A | 7/1992 | Kaehler |
| 5,689,619 A | 11/1997 | Smyth |
| 5,764,222 A | 6/1998 | Shieh |
| 5,870,083 A | 2/1999 | Shieh |
| 5,956,020 A | 9/1999 | D'Amico et al. |
| 6,160,536 A | 12/2000 | Forest |

(Continued)

FOREIGN PATENT DOCUMENTS

| | | |
|---|---|---|
| CN | 101794179 A | 8/2010 |
| CN | 102150115 A | 8/2011 |

(Continued)

OTHER PUBLICATIONS

Simpson, R., et al.; Research in Computer Access Assessment and Intervention, NIH Public Access Author Manuscript, Phys Med Rehabil Clin N Am. Feb. 2010; 21(1): 15-32. doi:10.1016/j.pmr.2009.07.006.

(Continued)

*Primary Examiner* — Carolyn R Edwards
*Assistant Examiner* — Bipin Gyawali
(74) *Attorney, Agent, or Firm* — Lorenz & Kopf, LLP

(57) ABSTRACT

Disclosed are methods and systems for improving touch utility on a touch screen display user interface providing a rule-based mask that enables or limits a function in a way that allows a user or developer to enhance precision or efficiency of input, or to create a unique modality of input. A method of touch-based user interaction with a touch screen device includes providing a virtual mask overlaying one or more of a plurality of virtual objects on the touch screen device and defining a mask area, sensing a touch within the mask area, the touch generating a touch data signal, and applying one or more combination of interaction, graphical rendering and/or visual feedback rules to the touch data signal and graphical objects. The interaction, graphical rendering and visual feedback rules can exist individually or in combination.

14 Claims, 12 Drawing Sheets

(56) References Cited

U.S. PATENT DOCUMENTS

| | | | |
|---|---|---|---|
| 6,181,328 B1 | 1/2001 | Shieh et al. | |
| 6,377,966 B1 * | 4/2002 | Cooper | G06F 3/018 345/467 |
| 6,459,424 B1 | 10/2002 | Resman | |
| 6,636,897 B1 | 10/2003 | Sherman et al. | |
| 6,831,631 B2 | 12/2004 | Chuang | |
| 7,050,894 B2 * | 5/2006 | Halm | B64D 47/00 701/29.4 |
| 7,176,902 B2 | 2/2007 | Peterson, Jr. et al. | |
| 7,289,102 B2 | 10/2007 | Hinckley et al. | |
| 7,295,191 B2 | 11/2007 | Kraus et al. | |
| 7,411,575 B2 | 8/2008 | Hill et al. | |
| 7,489,303 B1 | 2/2009 | Pryor | |
| 7,561,143 B1 | 7/2009 | Milekic | |
| 7,693,869 B2 | 4/2010 | Hutson et al. | |
| 7,730,401 B2 | 6/2010 | Gillespie et al. | |
| 7,782,307 B2 | 8/2010 | Westerman et al. | |
| 7,834,855 B2 | 11/2010 | Hotelling et al. | |
| 7,847,789 B2 | 12/2010 | Kolmykov-Zotov et al. | |
| 7,895,522 B2 | 2/2011 | Wong et al. | |
| 8,018,440 B2 | 9/2011 | Townsend et al. | |
| 8,085,252 B1 | 12/2011 | Lee et al. | |
| 8,086,275 B2 * | 12/2011 | Wykes | G06F 3/0482 455/456.1 |
| 8,136,053 B1 | 3/2012 | Miller et al. | |
| 8,355,698 B2 * | 1/2013 | Teng | H04M 1/67 455/411 |
| 8,370,005 B2 * | 2/2013 | Wilson | G01C 23/005 244/183 |
| 8,471,783 B2 | 6/2013 | Rhodes | |
| 8,704,792 B1 * | 4/2014 | Kataoka | G06F 3/0416 345/173 |
| 8,754,872 B2 * | 6/2014 | Geiger | G06F 3/0488 345/173 |
| 8,902,259 B1 * | 12/2014 | Zheng | G09G 5/373 345/661 |
| 2004/0150626 A1 | 8/2004 | Husman et al. | |
| 2004/0212601 A1 | 10/2004 | Cake et al. | |
| 2004/0218830 A1 | 11/2004 | Kang et al. | |
| 2004/0234107 A1 | 11/2004 | Machida et al. | |
| 2005/0017957 A1 | 1/2005 | Yi | |
| 2005/0243054 A1 | 11/2005 | Beymer et al. | |
| 2006/0161871 A1 * | 7/2006 | Hotelling et al. | 715/863 |
| 2006/0221061 A1 | 10/2006 | Fry | |
| 2006/0279548 A1 | 12/2006 | Geaghan | |
| 2007/0152976 A1 | 7/2007 | Townsend et al. | |
| 2007/0268269 A1 | 11/2007 | Chang et al. | |
| 2007/0273671 A1 | 11/2007 | Zadesky et al. | |
| 2008/0042988 A1 | 2/2008 | Westerman et al. | |
| 2008/0100586 A1 | 5/2008 | Smart | |
| 2008/0158146 A1 | 7/2008 | Westerman | |
| 2008/0165154 A1 | 7/2008 | Kim | |
| 2008/0284739 A1 | 11/2008 | Andrews et al. | |
| 2009/0058819 A1 | 3/2009 | Gioscia et al. | |
| 2009/0082107 A1 | 3/2009 | Tahara et al. | |
| 2009/0085894 A1 | 4/2009 | Gandhi et al. | |
| 2009/0156363 A1 | 6/2009 | Guidi et al. | |
| 2009/0174676 A1 | 7/2009 | Westerman | |
| 2009/0174679 A1 | 7/2009 | Westerman | |
| 2009/0244032 A1 | 10/2009 | Westerman et al. | |
| 2009/0251432 A1 | 10/2009 | Wang et al. | |
| 2009/0262089 A1 | 10/2009 | Wang | |
| 2009/0273571 A1 | 11/2009 | Bowens | |
| 2009/0296988 A1 | 12/2009 | Yamazaki et al. | |
| 2009/0322683 A1 | 12/2009 | Tsuji et al. | |
| 2009/0322687 A1 | 12/2009 | Duncan et al. | |
| 2010/0020038 A1 | 1/2010 | Vogel et al. | |
| 2010/0053095 A1 | 3/2010 | Wu et al. | |
| 2010/0100849 A1 | 4/2010 | Fram | |
| 2010/0115473 A1 * | 5/2010 | Reeves et al. | 715/863 |
| 2010/0127995 A1 | 5/2010 | Rigazio et al. | |
| 2010/0146459 A1 | 6/2010 | Repka | |
| 2010/0146463 A1 | 6/2010 | Cho et al. | |
| 2010/0149130 A1 | 6/2010 | Jung et al. | |
| 2010/0156795 A1 | 6/2010 | Kim et al. | |
| 2010/0169766 A1 | 7/2010 | Duarte et al. | |
| 2010/0188352 A1 | 7/2010 | Ikeda | |
| 2010/0188371 A1 | 7/2010 | Lowles et al. | |
| 2010/0194713 A1 | 8/2010 | Kawashima et al. | |
| 2010/0207894 A1 | 8/2010 | Tsuei | |
| 2010/0225595 A1 | 9/2010 | Hodges et al. | |
| 2010/0235793 A1 * | 9/2010 | Ording et al. | 715/863 |
| 2010/0245258 A1 | 9/2010 | Stewart et al. | |
| 2010/0269040 A1 * | 10/2010 | Lee | G06F 3/04817 715/702 |
| 2010/0273533 A1 * | 10/2010 | Cho | G06F 3/04886 455/566 |
| 2010/0280753 A1 * | 11/2010 | Chytil et al. | 701/208 |
| 2010/0289759 A1 | 11/2010 | Fisher et al. | |
| 2010/0289768 A1 | 11/2010 | Nakao | |
| 2010/0315267 A1 | 12/2010 | Chung et al. | |
| 2010/0315371 A1 | 12/2010 | Katsu et al. | |
| 2011/0006996 A1 | 1/2011 | Smith et al. | |
| 2011/0012855 A1 | 1/2011 | Yeh et al. | |
| 2011/0037705 A1 | 2/2011 | Yilmaz | |
| 2011/0074544 A1 | 3/2011 | D'Souza | |
| 2011/0090169 A1 | 4/2011 | Karhiniemi | |
| 2011/0157172 A1 | 6/2011 | Bennett et al. | |
| 2011/0175932 A1 | 7/2011 | Yu et al. | |
| 2011/0187651 A1 * | 8/2011 | Whitlow | G06F 3/041 345/173 |
| 2011/0187661 A1 | 8/2011 | Wakizaka et al. | |
| 2011/0199327 A1 | 8/2011 | Shin et al. | |
| 2011/0210926 A1 * | 9/2011 | Pasquero et al. | 345/173 |
| 2011/0214162 A1 | 9/2011 | Brakensiek et al. | |
| 2011/0227872 A1 | 9/2011 | Huska et al. | |
| 2011/0231793 A1 * | 9/2011 | Wilson | G06F 3/04845 715/810 |
| 2011/0254798 A1 | 10/2011 | Adamson et al. | |
| 2011/0271216 A1 | 11/2011 | Wilson | |
| 2011/0285645 A1 | 11/2011 | Cho et al. | |
| 2011/0291944 A1 | 12/2011 | Simmons et al. | |
| 2011/0291948 A1 | 12/2011 | Stewart et al. | |
| 2011/0291985 A1 | 12/2011 | Wakako et al. | |
| 2011/0310001 A1 | 12/2011 | Madau et al. | |
| 2011/0316807 A1 | 12/2011 | Corrion | |
| 2012/0011438 A1 | 1/2012 | Kim et al. | |
| 2012/0013570 A1 | 1/2012 | Murata | |
| 2012/0021806 A1 | 1/2012 | Maltz | |
| 2012/0022720 A1 | 1/2012 | Deleris et al. | |
| 2012/0036445 A1 | 2/2012 | Ganille et al. | |
| 2012/0105486 A1 | 5/2012 | Lankford et al. | |
| 2012/0154293 A1 | 6/2012 | Hinckley et al. | |
| 2012/0169604 A1 | 7/2012 | Chen et al. | |
| 2012/0180002 A1 * | 7/2012 | Campbell | G06F 17/246 715/863 |
| 2012/0242591 A1 | 9/2012 | Kawalkar | |
| 2012/0254808 A1 * | 10/2012 | Gildfind | 715/863 |
| 2013/0063423 A1 * | 3/2013 | Hsu | G06F 3/04842 345/419 |
| 2013/0097566 A1 * | 4/2013 | Berglund | 715/863 |
| 2013/0100043 A1 * | 4/2013 | Kolbe | G06F 3/0488 345/173 |
| 2013/0113719 A1 * | 5/2013 | Griffin | G06F 3/04883 345/173 |
| 2013/0249809 A1 | 9/2013 | Kawalkar et al. | |
| 2013/0254692 A1 * | 9/2013 | Han | G06F 3/0486 715/769 |
| 2013/0265596 A1 * | 10/2013 | Fujimoto | G06F 3/04842 358/1.9 |
| 2014/0043241 A1 | 2/2014 | Sukumar | |
| 2014/0082534 A1 | 3/2014 | Cleron et al. | |
| 2014/0120048 A1 | 5/2014 | Krueger | |
| 2014/0160048 A1 | 6/2014 | Conway et al. | |
| 2014/0164983 A1 | 6/2014 | Kawalkar et al. | |
| 2015/0153854 A1 * | 6/2015 | Stewart | G06F 1/163 345/173 |

FOREIGN PATENT DOCUMENTS

| | | |
|---|---|---|
| EP | 2077490 A2 | 7/2009 |
| EP | 2330487 A1 | 6/2011 |

(56) References Cited

FOREIGN PATENT DOCUMENTS

| JP | 10333737 | A | 12/1998 |
|---|---|---|---|
| JP | 10333737 | A1 | 12/1998 |
| JP | 2002287889 | A | 10/2002 |
| JP | 2009217814 | A | 9/2009 |
| TW | 201030592 | A1 | 8/2010 |
| TW | M439213 | U1 | 10/2012 |
| TW | 201248463 | A1 | 12/2012 |
| WO | 2005064587 | A2 | 7/2005 |
| WO | 2010040207 | A1 | 4/2010 |
| WO | 2010090033 | A1 | 8/2010 |

OTHER PUBLICATIONS

USPTO Office Action for U.S. Appl. No. 13/162,679; Notification date Jan. 14, 2014.
USPTO Office Action for U.S. Appl. No. 13/708,320 dated Aug. 28, 2014.
USPTO Office Action for U.S. Appl. No. 13/568,959 dated Aug. 20, 2014.
USPTO Notice of Allowance, Notification date Dec. 23, 2014; U.S. Appl. No. 13/708,320.
USPTO Office Action, Notification date Dec. 24, 2014; U.S. Appl. No. 13/597,021.
USPTO Final Office Action, Notification date Mar. 26, 2015; U.S. Appl. No. 13/568,959.
USPTO Final Office Action, Notification date Apr. 8, 2015; U.S. Appl. No. 13/597,021.
TW Office Action for Application No. TW 11110261 dated Feb. 23, 2016.
EP Search Report for Application EP13177917.5 dated Mar. 16, 2016.
Li, Xiaoxun et al., "A Comparison of SAE ARP 4754A and ARP 4754," vol. 17, Nov. 30, 2011.
USPTO Notice of Allowance, Notification date Mar. 9, 2016; U.S. Appl. No. 13/568,959.
EP Examination Report for Application No. EP 12160824.4 dated May 11, 2016.
EP Examination Report for Application No. 13177917.5-1959 dated Mar. 29, 2016.
CN Office Action for Application No. 201210161700 dated Feb. 1, 2016.
Xiaoxun, L. et al.; A Comparison of SAE ARP 4754A and ARP 4754; SciVerse Science Direct; The 2nd International Symposium on Aircraft Airworthiness (ISAA 2011).
EP Search Report for Application No. EP 12160824.4 dated Apr. 25, 2016.
China Office Action for Application No. 201210161700.X; date of Issue Oct. 10, 2016.
EP Examination Report for Application No. 13177917.5-1959 dated Dec. 12, 2016.
TW Office Action for Application No. 102144947 dated Jan. 13, 2017.
USPTO Advisory Action; Notification date Jun. 30, 2015; U.S. Appl. No. 13/568,959.
Chinese Third Office Action for Application No. 201210161700.X dated Apr. 24, 2017.

* cited by examiner

TOUCH SCREEN DISPLAY USER INTERFACE AND METHOD FOR IMPROVING TOUCH INTERFACE UTILITY ON THE SAME EMPLOYING A RULES-BASED MASKING SYSTEM

TECHNICAL FIELD

The exemplary embodiments described herein generally relate to touch screen display user interfaces and more particularly to a method for improving touch interface utility on a touch screen display user interface employing a rules-based masking system.

BACKGROUND

Touch screen display user interfaces that rely on gestural input from users are being used in myriad systems and environments. More and more, touch screen display user interfaces are being adopted as the primary input device in a variety of industrial, commercial, aviation, and consumer electronics applications. As such, there has been a shift from physical input modalities to virtual input modalities.

Virtual input modalities, while potentially expansive in function, have limitations in terms of flexibility to alter touch signal behavior, interactive graphical element's dynamic behavior, graphical rendering and filtering and user feedback either dynamically or at design time. Accordingly, it is desirable to provide a touch screen display user interface having improved touch utility to enhance the user experience. The present disclosure addresses at least this need.

BRIEF SUMMARY

The present disclosure is directed to a rule-based masking system and method that enables or limits a function on a touch screen display device to enhance precision, efficiency, or to provide a unique input modality and graphical rendering. The interaction and graphical rendering rules described herein can be designed by a developer or a user to suit the needs of any implementation on which the novel system and methods presented herein are employed.

A rules-based mask is employed as an instrument for designers that enables them to improve on multiple usability characteristics of the underlying touch screen interface. Primarily, the rules-based mask provides runtime flexibility to associate any interaction rule to improve user experience, reduce interaction errors, and improve accuracy. Further, the rules-based mask provides special visual feedback based on situational rules, provides flexibility to extend interactive graphical elements' dynamic behavior, and adds or removes any graphical rendering filters interactively and dynamically on underlying graphical elements. These capabilities of the inventive subject matter improves the overall utility of the touch screen interfaces.

In one exemplary, non-limiting embodiment, a method of touch-based user interaction with a touch screen device includes providing a virtual mask overlaying one or more of a plurality of virtual objects on the touch screen device and defining a mask area, sensing a touch within the mask area, the touch generating a touch data signal, and applying one or more interaction rules to the touch data signal.

In another exemplary, non-limiting embodiment, a touch screen device includes a display screen, first circuitry configured to display at least one virtual object through the display screen, second circuitry configured to sense touches applied to the at least one virtual object, and a processor configured to: provide a virtual mask overlaying the at least one virtual object and defining a mask area, sense a touch within the mask area, the touch generating a touch data signal, and apply one or more interaction rules to the touch data signal.

In yet another exemplary, non-limiting embodiment, a method of interaction with a virtual object displayed on a touch screen device includes providing a virtual mask overlaying the virtual object and defining a mask area, sensing a touch within the mask area, the touch generating a touch data signal, and applying one or more interaction rules to the touch data signal, wherein the one or more rules are provided to improve the efficiency of input on the touch screen device.

In some embodiments, the methods may include providing a feedback data signal to the touch screen device. In other embodiments, the methods may include applying one or more interaction rules to generate the feedback data signal. The feedback data signal causes the touch screen device to generate one or more of a visual, a tactile, and an aural feedback response.

In further embodiments, the mask area is user defined. For example, the mask area may be defined by the user indicating bounds of the area by touching the touch screen device. The interaction rules are not applied when the touch occurs outside of the mask area. In other embodiments, the one or more rules are developer defined.

In still further embodiments, the one or more interaction rules provide a de-cluttering algorithm in the mask area. De-cluttering may be applied dynamically. In other embodiments, the one or more interaction rules provides layer activation or graphical processing algorithms in the mask area. In further embodiments, the one or more interaction rules provides a protected control algorithm in the mask area. The protected control algorithm prevents activation of a function corresponding with a touch input of an interactive graphical user interface element when the mask area is not provided over the virtual object.

Furthermore, other desirable features and characteristics of the touch screen display user interfaces will become apparent from the subsequent detailed description and the appended claims, taken in conjunction with the accompanying drawings and the preceding background.

BRIEF DESCRIPTION OF THE DRAWINGS

The present disclosure will hereinafter be described in conjunction with the following drawing figures, wherein like numerals denote like elements, and wherein.

DETAILED DESCRIPTION

Figure 1:
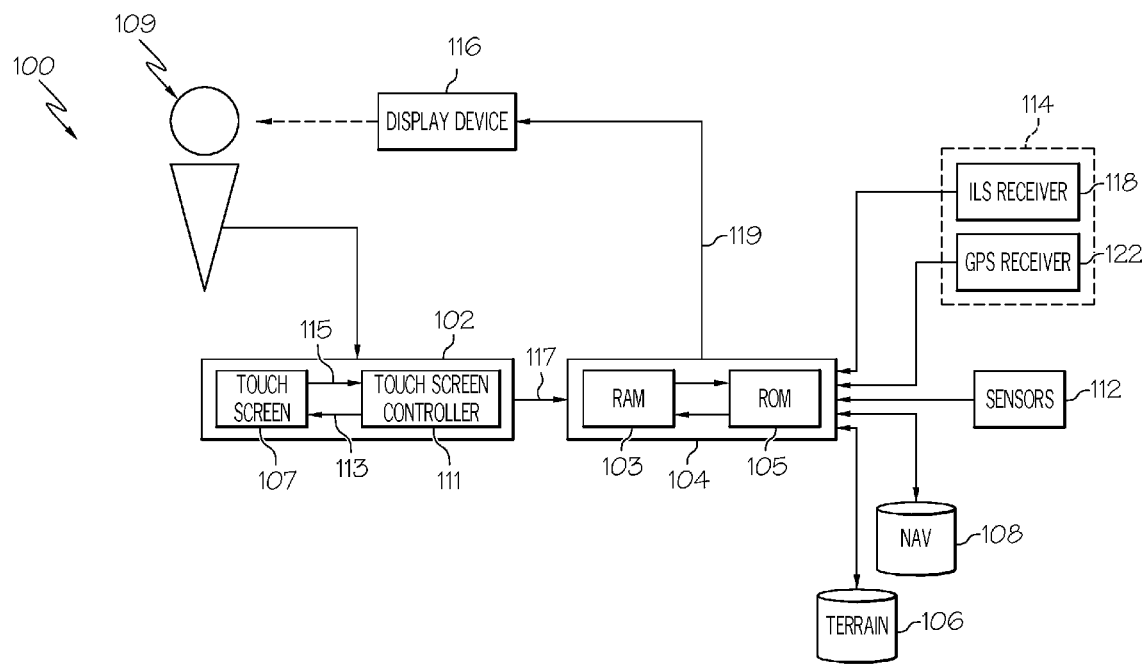
FIG. 1 is a block diagram of an aircraft system including a touch screen display.

The following detailed description is merely illustrative in nature and is not intended to limit the embodiments of the subject matter or the application and uses of such embodiments. Any implementation described herein as exemplary is not necessarily to be construed as preferred or advantageous over other implementations. Furthermore, there is no intention to be bound by any expressed or implied theory presented in the preceding technical field, background, brief summary, or the following detailed description.

Techniques and technologies may be described herein in terms of functional and/or logical block components and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

For the sake of brevity, conventional techniques related to graphics and image processing, touch screen displays, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The present disclosure is directed to a rule-based masking system and method that enables or limits a function on a touch screen display device to enhance and improve user experience, reduce interaction errors, and improve accuracy. The interaction rules described herein can be designed by a developer or a user to suit the needs of any implementation on which the novel system and methods presented herein are employed.

The presently described touch screen user interface display and method is designed to operate in conjunction with, and as an extension of, the touch screen device and method disclosed in commonly assigned U.S. patent application Ser. No. 13/162,679, titled "TOUCH SCREEN AND METHOD FOR PROVIDING STABLE TOUCHES," filed Jun. 17, 2011. As such, U.S. patent application Ser. No. 13/162,679 is expressly incorporated by reference into the present disclosure in its entirety as if set forth fully herein. The presently described touch screen user interface display and method provide a suite of features extending the aforementioned patent application that improve the usability and efficiency of touch panels and touch accuracy. A "mask" over a normally touched area on a user interface display, which can be embodied in various forms including, but not limited to virtual keyboards, smartphones, and other touch-based input devices for use in various industrial, commercial, aviation, and consumer electronics applications, is used to define an area where gestures can be interpreted for some control functions. As such, a virtual interface is disclosed that employs rules-based logic to activate and deactivate regions of a touch interface to improve input efficiency. These and other features will be described in greater detail herein.

Disclosed herein is a novel touch screen display user interface and method that improves touch interface utility, for example by improving user experience, reducing interaction errors, and improving accuracy through a rules-based masking system. The rules-based masking system enables user or developer defined interaction with the user interface that extends beyond and is independent of the particular operating system or application to which the user's inputs are directed. Presented herein for purposes of explication are certain exemplary embodiments of how the rules-based masking system may be employed on a particular device. For example, the common embodiment of a keyboard will be discussed for ease of illustration as keyboards are often employed in virtual input environments. Further, the example of a user interface suitable for use in aviation applications will also be discussed. However, a person having ordinary skill in the art will appreciate that these explicated example embodiments are merely examples and guides for implementing the novel systems and methods herein on any touch screen display user interface in any industrial, commercial, aviation, or consumer electronics application. As such, the examples presented herein are intended as non-limiting.

The method and touch screen display user interface of the exemplary embodiments may be used in any type of electronic device that employs a touch screen display user interface. For example, the exemplary embodiments described herein may be employed in applications including, but not limited to, vehicles and heavy machinery, small handheld mobile devices such as smart phones, aircraft systems such as cockpit displays and other aviation implementations, and various other industrial, commercial, aviation, and consumer electronics-based implementations. Other exemplary implementations will be apparent to those having ordinary skill in the art. As such, the example implementations presented herein are provided as non-limiting guideposts for the personal having ordinary skill in the art to implement other rules and functions as may be desirable in any given application.

FIG. 1 is illustrative of one of the aforementioned exemplary implementations. While this exemplary implementation is described in detail, it will be appreciated that the features disclosed with regard to the touch screen display user interface will be applicable to any particular implementation. In particular, FIG. 1 relates to an exemplary computing system. Computing system 100 includes a user interface 102, a processor 104, and one or more display devices 116. The user interface 102 is in operable communication with the processor 104 and is configured to receive input from a user 109 and, in response to the user input, supplies command signals to the processor 104. The user interface 102 may include, in part, any one, or combination, of various known user interface devices including, but not limited to, one or more buttons, switches, or knobs (not shown). In the depicted embodiment, the user interface 102 also includes a touch screen 107 and a touch screen controller 111. The touch screen controller 111 provides drive signals 113 to a touch screen 107, and a sense signal 115 is provided from the touch screen 107 to the touch screen controller 111, which periodically provides a controller signal 117 of the determination of a touch to the processor 104. The processor 104 interprets the controller signal 117, determines the application of the digit on the touch screen 107, and provides, for example, a controller signal 117 to the touch screen controller 111 and a signal 119 to the display device 116. Therefore, the user 109 uses the touch screen 107 to provide an input as more fully described hereinafter.

The processor 104 may be implemented or realized with a general purpose processor, a content addressable memory, a digital signal processor, an application specific integrated circuit, a field programmable gate array, any suitable programmable logic device, discrete gate or transistor logic, discrete hardware components, or any combination designed to perform the functions described herein. A processor device may be realized as a microprocessor, a controller, a microcontroller, or a state machine. Moreover, a processor device may be implemented as a combination of computing devices, e.g., a combination of a digital signal processor and a microprocessor, a plurality of microprocessors, one or more microprocessors in conjunction with a digital signal processor core, or any other such configuration. In the depicted embodiment, the processor 104 includes on-board RAM (random access memory) 103, and on-board ROM (read-only memory) 105. The program instructions that control the processor 104 may be stored in either or both the RAM 103 and the ROM 105. For example, the operating system software may be stored in the ROM 105, whereas various operating mode software routines and various operational parameters may be stored in the RAM 103. The software executing the exemplary embodiment is stored in either the ROM 105 or the RAM 103. It will be appreciated that this is merely exemplary of one scheme for storing operating system software and software routines, and that various other storage schemes may be implemented.

The memory 103, 105 may be realized as RAM memory, flash memory, EPROM memory, EEPROM memory, registers, a hard disk, a removable disk, a CD-ROM, or any other form of storage medium known in the art. In this regard, the memory 103, 105 can be coupled to the processor 104 such that the processor 104 can be read information from, and write information to, the memory 103, 105. In the alternative, the memory 103, 105 may be integral to the processor 104. As an example, the processor 104 and the memory 103, 105 may reside in an ASIC. In practice, a functional or logical module/component of the display system 100 might be realized using program code that is maintained in the memory 103, 105. For example, the memory 103, 105 can be used to store data utilized to support the operation of the display system 100, as will become apparent from the following description.

No matter how the processor 104 is specifically implemented, it is in operable communication with the terrain databases 106, the navigation databases 108, and the display devices 116, and is coupled to receive various types of inertial data from the sensors 112, and various other avionics-related data from the external data sources 114. The processor 104 is configured, in response to the inertial data and the avionics-related data, to selectively retrieve terrain data from one or more of the terrain databases 106 and navigation data from one or more of the navigation databases 108, and to supply appropriate display commands to the display devices 116. The display devices 116, in response to the display commands, selectively render various types of textual, graphic, and/or iconic information.

The display devices 116, as noted above, in response to display commands supplied from the processor 104, selectively render various textual, graphic, and/or iconic information, and thereby supplies visual feedback to the user 109. It will be appreciated that the display device 116 may be implemented using any one of numerous known display devices suitable for rendering textual, graphic, and/or iconic information in a format viewable by the user 109. Non-limiting examples of such display devices include various cathode ray tube (CRT) displays, and various flat screen displays such as various types of LCD (liquid crystal display) and TFT (thin film transistor) displays. The display devices 116 may additionally be implemented as a screen mounted display, or any one of numerous known technologies.

There are many types of touch screen sensing technologies, including capacitive, resistive, infrared, surface acoustic wave, and embedded optical. All of these technologies sense touches on a screen. For example, U.S. Pat. No. 6,492,979 discloses the use of a combination of capacitive touch screen and force sensors, U.S. Pat. No. 7,196,694 discloses the use of force sensors at the peripherals of the touch screen to determine the position of a touch, and U.S. Patent Application Publication 2007/0229464 discloses the use of a capacitive force sensor array, overlaying a display to form a touch screen. While a touch screen is described wherein the application of the touch is determined by a change in resistance, there are many other technologies available that could be used, including Infrared and capacitive.

Figure 2:
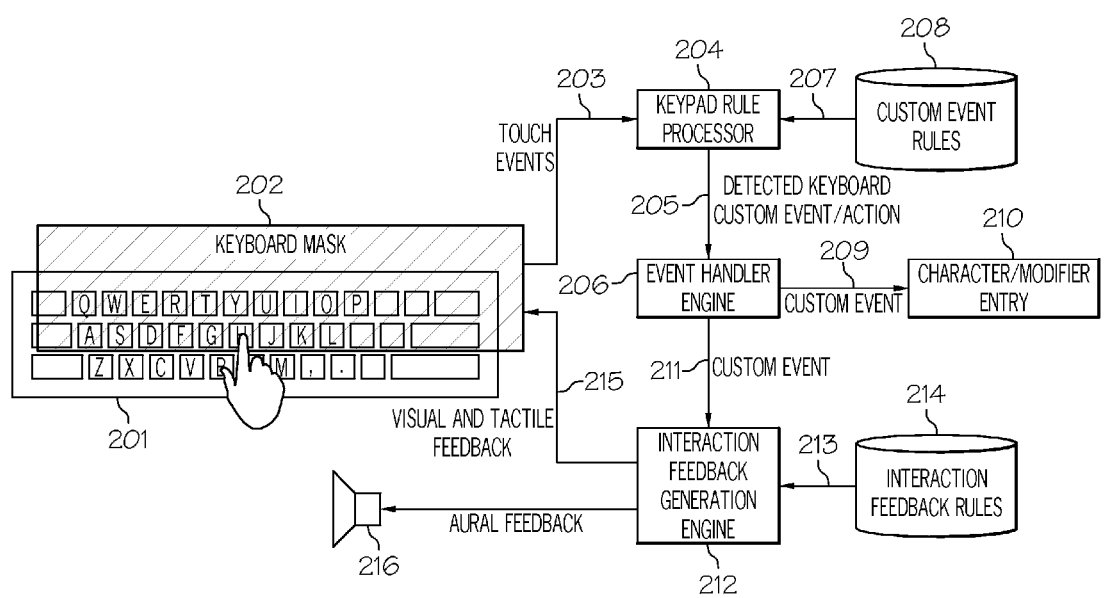
FIG. 2 is a block diagram of an exemplary touch screen display user interface system in accordance with the present disclosure.

FIG. 2 is illustrative of another one of the aforementioned exemplary implementations showing how the rule-based mask enables or limits a function is a way that allows a user or developer to enhance precision or efficiency of input, or to create a unique modality of input. While this exemplary implementation is described in detail, it will be appreciated that the features disclosed with regard to the touch screen display user interface will be applicable to any particular implementation. In particular, due to the ubiquity of keyboards for use in data input and for ease of illustration, the implementation of FIG. 2 is a virtual keyboard, but the concepts described with respect thereto will be broadly applicable to any implementation.

An image 201 including user interface virtual objects (hereinafter referred to simply as "objects") forms the visual display that the user will see displayed on the touch screen device. While a keyboard is shown in this exemplary embodiment, it will be appreciated that the concepts disclosed herein can be extended to a variety of visual touch screen displays, including but not limited to drop down files and other button objects. The image 201 is an image corresponding to a keypad in accordance with the present disclosure. The image 201 does not contain any user interface button as found in normal touch screen based keypad schemes, where each key corresponds to individual button object. Rather, the image 201 uses a graphical image representative of the visual keypad layout, or other image depending on the particular implementation. A rules-based mask 202 is then overlaid on the image 201, as will be discussed in greater detail below.

The rules-based mask 202 is a mask layer, including an invisible layer that is overlaid on the underlying image 201. This mask layer 202 is the only touch event receptor object in the system design as presented herein. This mask 202 primarily receives the touch events and sends them to further stages in the system for detection of various custom events defined by various criteria. Apart from being the primary touch event receptor object, the mask 202 also acts as a host for displaying visual feedback as defined by the Haptic Feedback Generation Engine, as will be discussed in greater detail below (with reference to numeral 212).

When a touch is recognized on the mask 202, touch data 203 is directed to a rule processor 204. This rule processor 204 receives the touch events (i.e., the data 203 therefrom) from the mask 202 and detects whether any custom event is reached as defined in the custom event rules 208. In particular, the custom event defines a character entry, modification, or mode switching actions. Custom event rules are transferred as data 207 to the rule processor 204 for such detection. Upon successful detection, the custom event is then passed on to further processing stages as data 205.

With continued reference to FIG. 2, an event handler engine 206 is disclosed receiving data 205. This event handler engine 206 receives the custom event detected by the rule processor 204 and performs intended actions. The engine 206 breaks down the received event into sub-events and routes them to appropriate components for actual handling. In addition, this engine 206 handles mode control events, corresponding to data entry, the type of data depending on the particular implementation (in this example, keyboard characters).

Data 209 may be sent from the event handler engine 206 to the character/modifier entry component 210. This component 210 receives and handles sub-events as generated by the event handler engine 206 corresponding to character or object entry or modification actions. Further, data 211 may be sent from the event handler engine 206 to the interaction feedback generation engine 212. This engine 212 receives the custom event and generates corresponding interaction feedback defined in the interaction feedback rules database 214. Such data 213 may be transferred from the rules database 214 to the engine 212, as shown in FIG. 2. The interaction feedback provided by the engine 212 could be combination of one or more visual, aural, or tactile modalities. Visual and tactile feedback is sent to the mask 202 by data 215. Aural feedback is sent to the audio device of the underlying system by data 216. The interaction feedback modality combinations and parameter values for the individual modalities are stored in the interaction feedback rules database 214, and are keyed by the custom event identification.

Greater detail will now be provided with regard to the design of the image 201. In one aspect, it is again noted that the present disclosure is provided to operate in conjunction with, and as an extension of, commonly assigned U.S. patent application Ser. No. 13/162,679, titled "TOUCH SCREEN AND METHOD FOR PROVIDING STABLE TOUCHES," filed Jun. 17, 2011. As explicated in greater detail in this patent application, user defined areas on the image 201 are statically or dynamically drawn geometrical regions on a touch screen where touch input is blocked. As such, a system is provided for stabilizing a user's hand(s) to avoid inadvertent screen touches and abnormal application behavior. As disclosed herein, dynamic masks 202 can be drawn in any geometry over select or entire regions of a touch screen 201. The rules-based masks 202 described herein may be enabled or disabled (partially or completely) using sets of rules. Rules may be as simple or complex as an application or use(r) needs, and can be developed by a developer or by the user to meet the needs of any given implementation.

In one example, rules may be provided to achieve improved input accuracy concerning touch velocity and concerning hover time. For example, when a user's finger or stylus is moving at a velocity>0 then stops and hovers for X milliseconds, the system registers the preconfigured touch event. The system is designed to handle multi-touch by applying rules to multiple input points and may be configured by the user based on needs. Simple rule sets result not only in consistent results, but importantly lower processing overhead.

Figure 3:
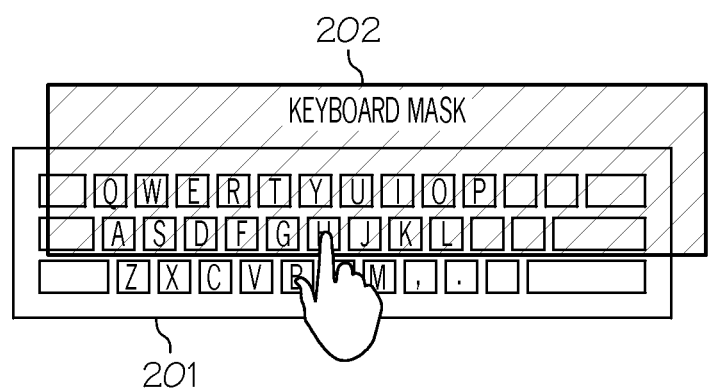
FIG. 3 illustrates and exemplary virtual mask in accordance with one embodiment.
Figure 4:
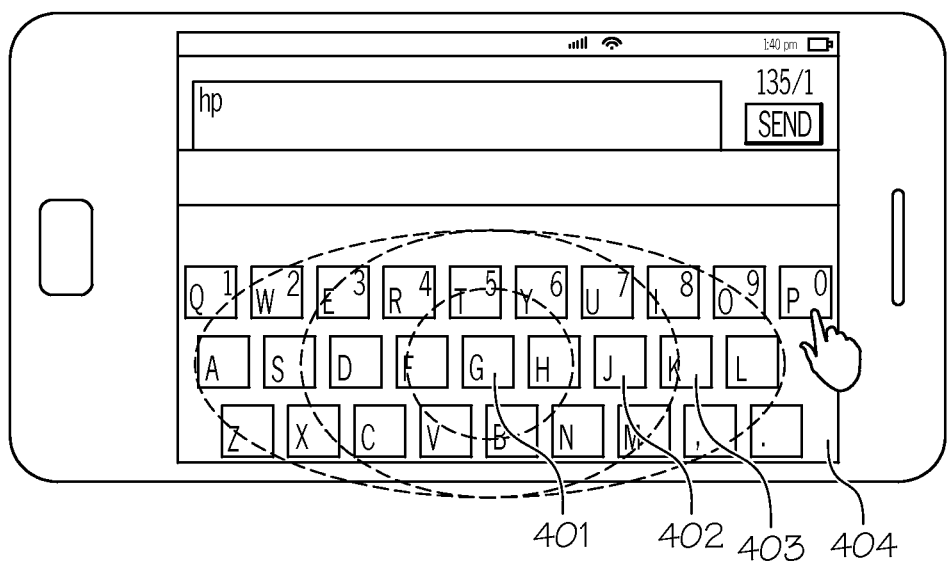
FIG. 4 illustrates and exemplary virtual mask in accordance with one embodiment.

As discussed above, the rules-based mask 202 is applied over the image 201. FIG. 3 presents an enlarged image thereof for clarity, derived from FIG. 2. Again, while FIG. 3 relates to the example implementation of a keyboard for ease of illustration, it will be appreciated that the concepts can be extended to any implementation. In one embodiment, a buffering scheme may be applied to expand the "touch zone" for a touch event based on screen resolution, button size and position, and handedness of the user. This scheme is provided to compensate for user systematic touch skewing. The scheme may be dynamically modified based on usage, and other criteria may be input into associated rules as a developer/user desires. FIG. 4 illustrates such a zone-defined mapping scheme (which can be extended to any implementation of display). As shown therein, four zones 401-404 are provided, however it will be appreciated that more or fewer zones may be provided.

In another example showing how the rule-based mask enables or limits a function is a way that allows a user or developer to enhance precision or efficiency of input, or to create a unique modality of input, gesture based inputs have been commonly used to reduce complexity in operating multi-touch mobile devices, including but not limited to virtual keyboards. The presently disclosed system implementation (image 201) as depicted in the preceding figures includes no "space bar", "carriage return", "shift", "number", "symbol" or "delete keys". These keys are replaced with gestures and novel combinational touch inputs shown in the Table 1 and alternatively as defined in the Table 2 below; a depiction of the novel gesture and touch combinational interaction is provided as depicted FIGS. 5 and 6 as alternate interface methods. Other actions/events can be likewise extended to other modifier buttons or objects as suited for other implementations.

| Action/Event | Gesture using Visual Modifier Buttons |
| --- | --- |
| Uppercase Letter Entry Mode | Swipe Up |
| Lowercase Letter Entry Mode | Swipe down from current entry mode. |
| Number and Symbol Entry Mode | Swipe Down from Lowercase Entry Mode. |
| Insert Line Space | Single Tap for single line space. Tap multiple times for multiple line spaces. |
| Backspace/Delete | Swipe left |
| Carriage Return | Swipe Right anywhere on the keypad. |

Table 1 is an exemplary non-visual and active area independent gesture interface command listing.

| Action/Event | Gesture using Visual Modifier Buttons |
| --- | --- |
| Shift | Touch and hold at any arbitrary location on the keyboard and tap 'Shift' Button. |
| Invert the Character Case | Tap and hold the character and Tap 'Shift' Button. Tap multiple times to toggle between upper case and lower case. |

-continued

| Action/Event | Gesture using Visual Modifier Buttons |
| --- | --- |
| Insert Line Space | Tap and hold the character and press 'Space' Button. Tap multiple times for inserting multiple spaces. |
| Backspace/Delete | Tap and hold the character or at any arbitrary location on the keyboard, and Tap 'Delete' button. Multiple Taps or Tap/Hold would delete multple characters. |
| Number/Symbol | Tap and hold at any arbitrary location on the keyboard, and swipe on the 'Shift' Button. |
| Carriage Return | Tap and Hold 'Shift' Button. |

Table 2 is an exemplary visual modifier interface gesture command listing.

Figure 5A:
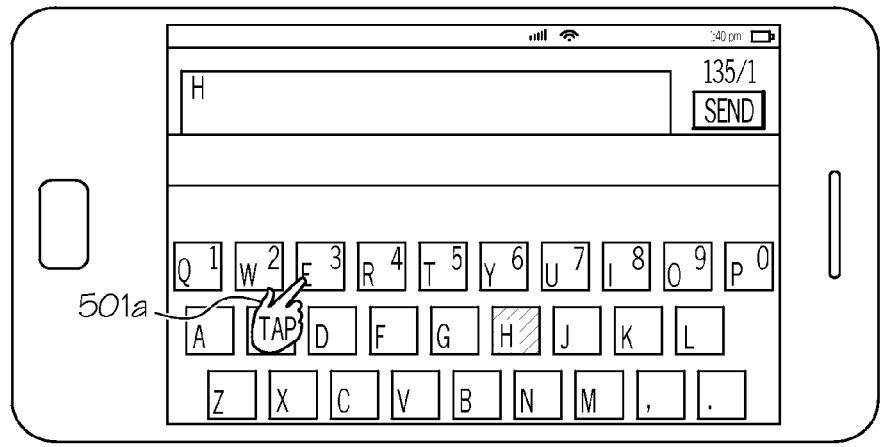
FIGS. 5a-c illustrate the use of an exemplary virtual mask in accordance with one embodiment.
Figure 5B:
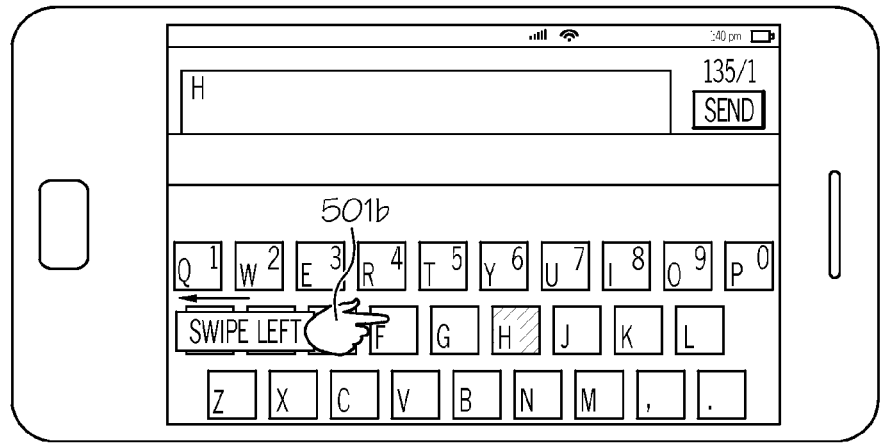
Figure 5C:
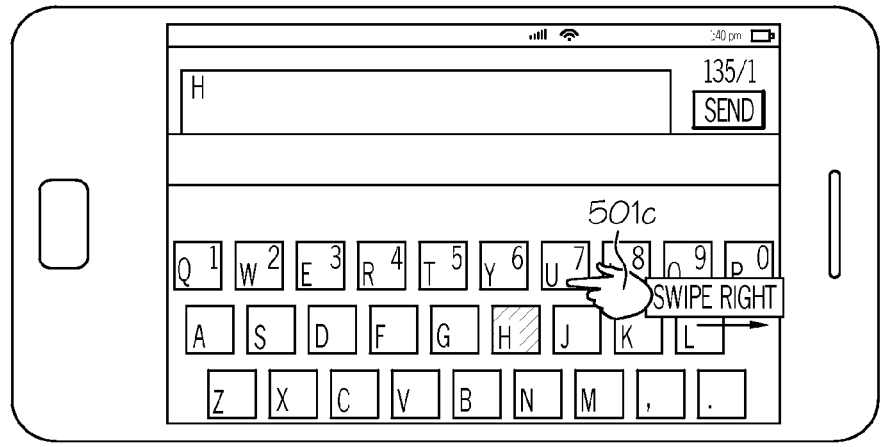
Figure 6A:
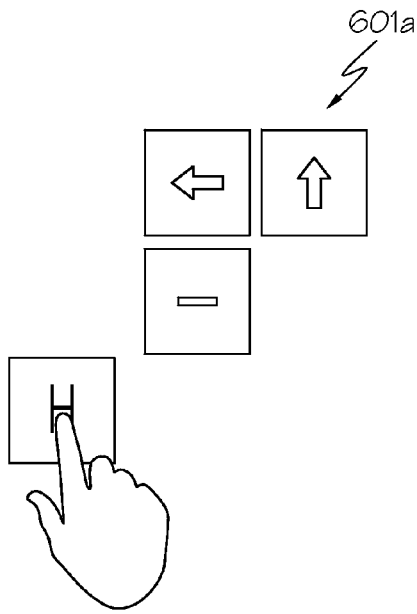
FIGS. 6a-d illustrate the use of an exemplary virtual mask in accordance with one embodiment.
Figure 6A:
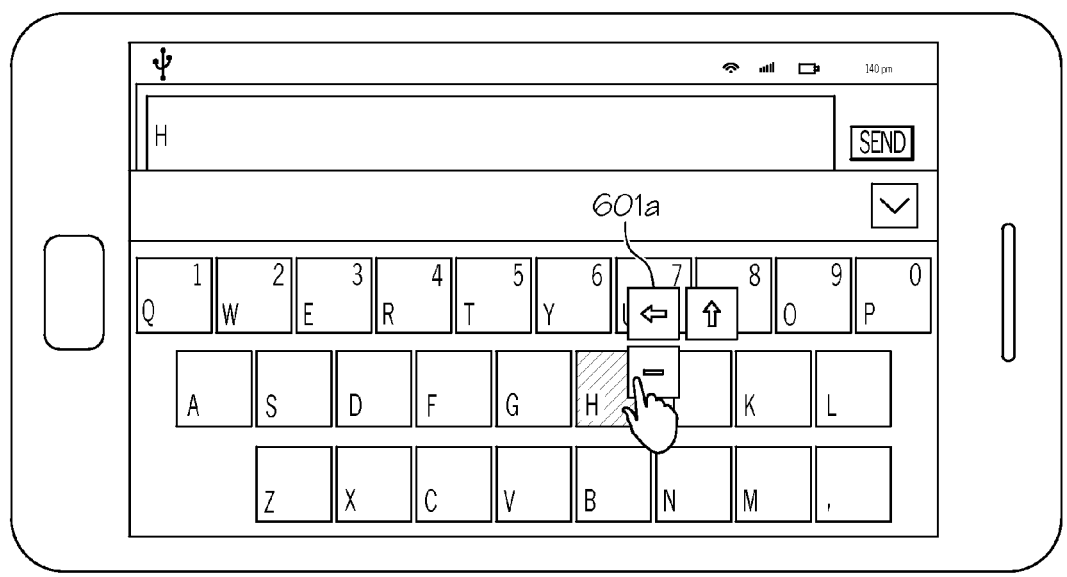
Figure 6B:
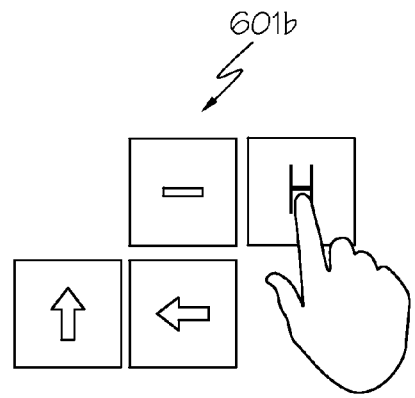
Figure 6B:
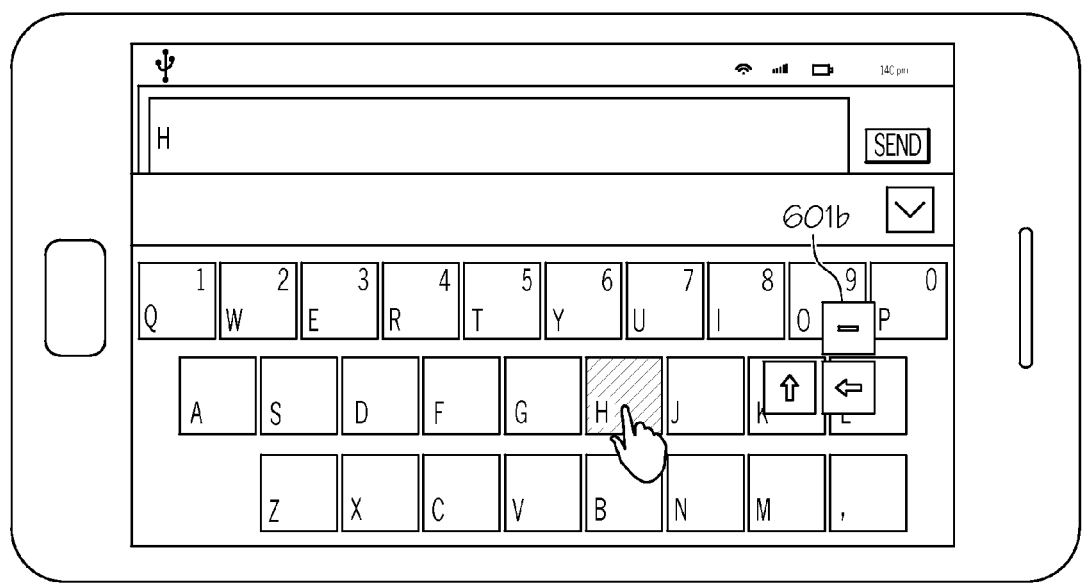
Figure 6C:
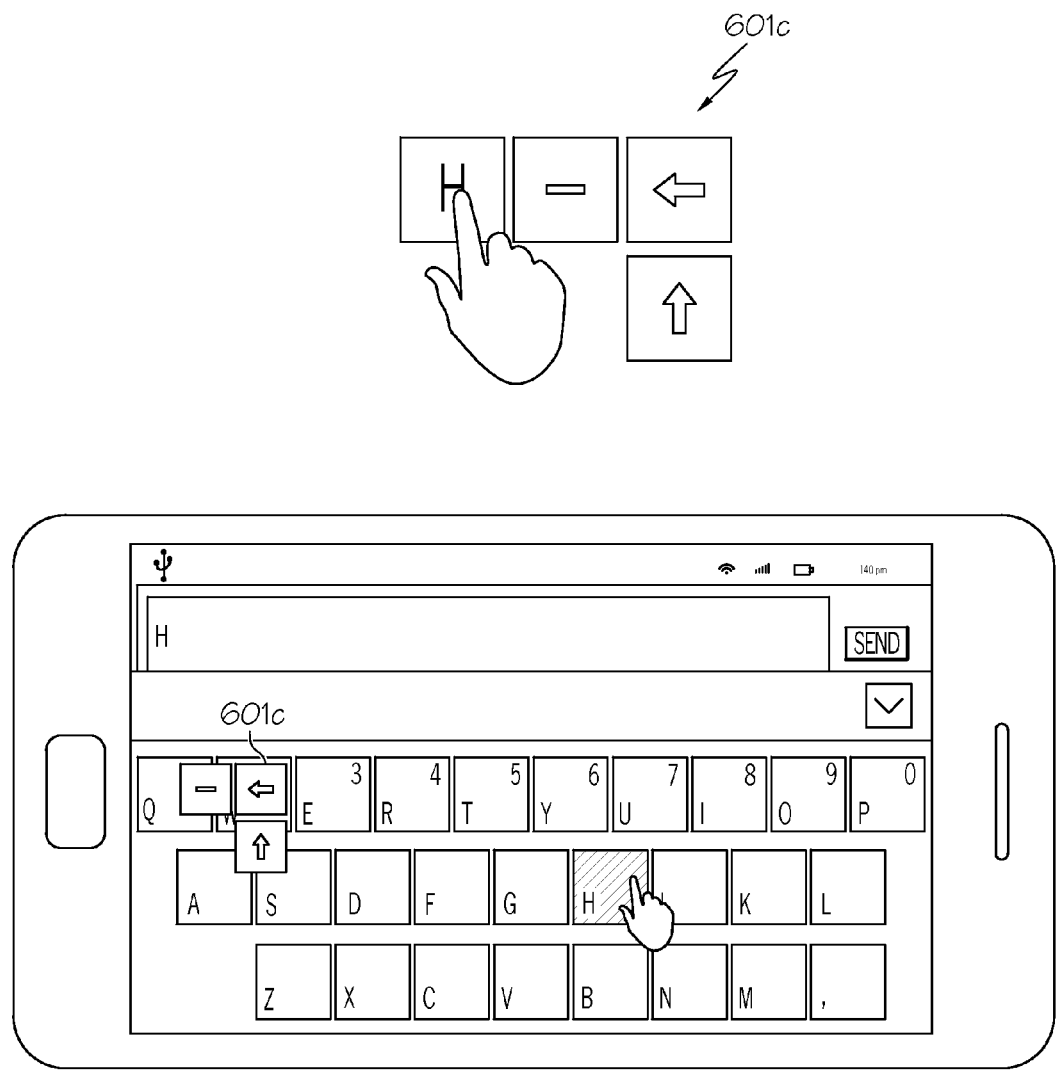
Figure 6D:
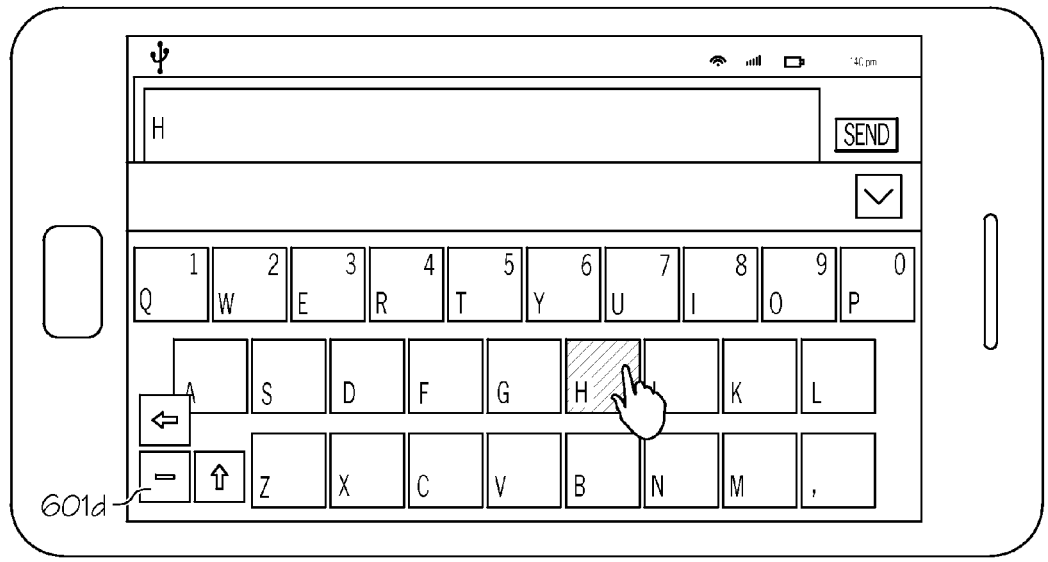

The touch combinations are provided with dedicated visual touch areas as depicted in FIGS. 5a-c. FIG. 5a depicts a spacebar gesture 501a (tap anywhere on the rules-based mask 202). FIG. 5b depicts a backspace gesture 501b (swipe left anywhere on the mask 202). FIG. 5c depicts a carriage return gesture (swipe right anywhere on the mask 202). Furthermore, exemplary in-place visual modifier buttons are provided in FIGS. 6a-d. FIG. 6a depicts visual modifier keys 601a for touch positions other than corners. FIG. 6b depicts visual modifier keys 601b for top right corner touch positions. FIG. 6c depicts visual modifier keys 601c for top left corner touch positions. Further, FIG. 6d depicts visual modifier keys 601d for bottom left corner touch position (a user can operate these buttons using the user's left hand). These visual touch sensitive areas are displayed around the touch point if the touch point hovers for preconfigured time duration and can be interacted with non-touching fingers. These visual touch sensitive areas are made invisible while the user is traversing the touch screen. The visual touch areas can be made invisible if user desires, upon sufficient experience with the modifier key locations. A further advantage of the presently described embodiment is that the size of the touch sensitive areas corresponding to individual characters can be increased, which optimizes the key or object placement and buffering as a function of the screen resolution.

Figure 7:
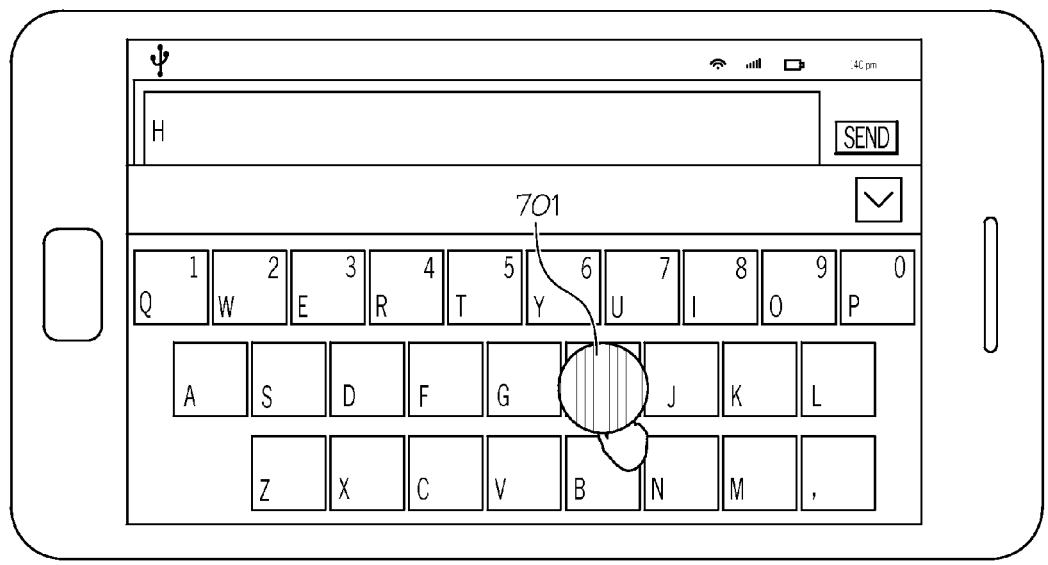
FIG. 7 illustrates an exemplary feedback response in accordance with one embodiment.

In a further example showing how the rule-based mask enables or limits a function is a way that allows a user or developer to enhance precision or efficiency of input, or to create a unique modality of input, and as discussed above, the touch screen interface can include a rules-based interaction feedback generation. One of the major problems with some known touch screens is that they offer limited feedback to users as they type on virtual displays and make inputs via buttons, etc. As such, the present disclosure includes an implementation of combined aural and visual stimuli. The system incorporates visual, tactile (vibration) and aural feedback for the user, based on rules of input specifically. For example, one non-limiting rule may include the user holding a key or object for, for example, 500 milliseconds (or any other length of time as may be desired) and a custom event is generated corresponding to a character entry and visual fading effect is displayed on the rules-based mask 202 around the touch area. FIG. 7 is illustrative of this concept. As shown therein, an exemplary visual feedback 701 is displayed on the overlaying mask 202.

The previous examples have been directed to the common implementation of a virtual keyboard for purposes of illustration. However, as previously discussed, extension of those concepts is anticipated to any type of touch screen display. As illustrative of such extensions, further applications of the novel rules-based masking system are provided with reference to FIGS. 8-11 showing how the rule-based mask enables or limits a function is a way that allows a user or developer to enhance precision or efficiency of input, or to create a unique modality of input. For example, the example interaction rules provided below with regard to FIGS. 8-11 may be suitable for use in aviation implementations, among others as will be appreciated by those having ordinary skill in the art.

Figure 8A:
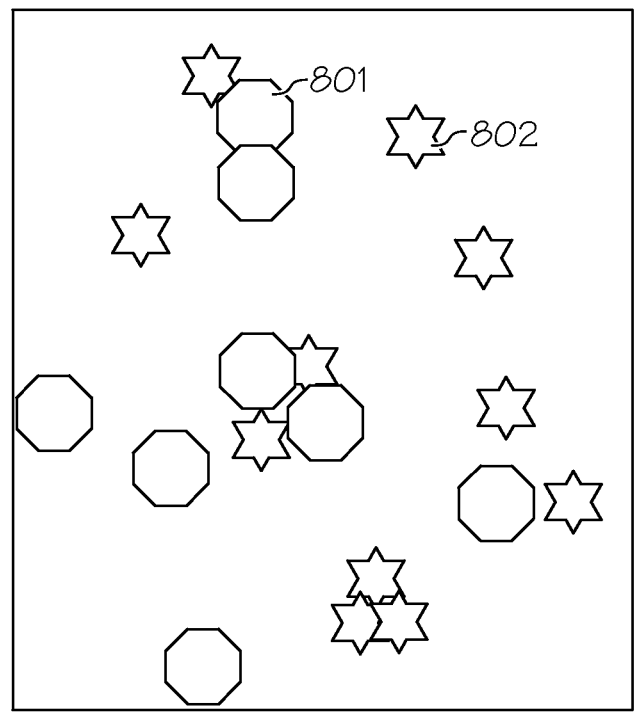
FIGS. 8a-b illustrate the use of a virtual mask in a de-cluttering application.
Figure 8B:
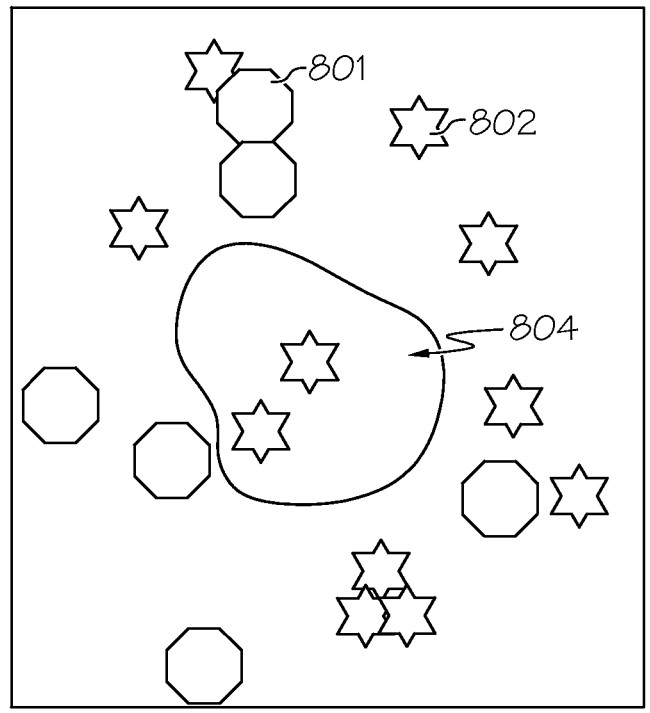

In one example, FIGS. 8a and 8b depict a rule-based de-cluttering application of the mask. The mask could be used for de-cluttering a specific region of the cluttered display. The de-cluttering rule or filter would be applied only to the display portion covered by the mask as dynamically specified by the user either through gesture or through predefined regular geometrical shapes. The de-cluttering rules can be either statically or dynamically configured through the corresponding user interface. FIG. 8a depicts a cluttered display, including a plurality of objects 801 and 802. In comparison, FIG. 8b depict a display that has been de-cluttered, in particular objects 801 have been removed from the display in the area defined by a user-defined mask 804.

Figure 9A:
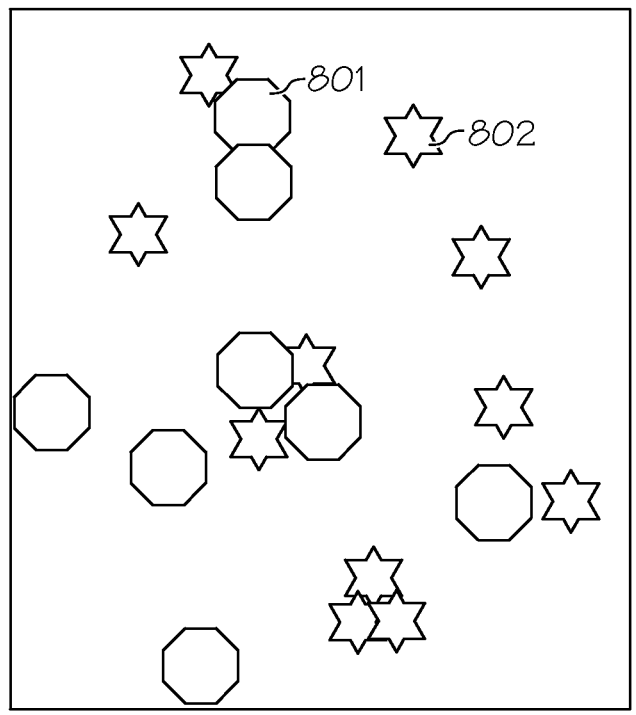
FIGS. 9a-b illustrate the use of a virtual mask in a display layering or rendering application.
Figure 9B:
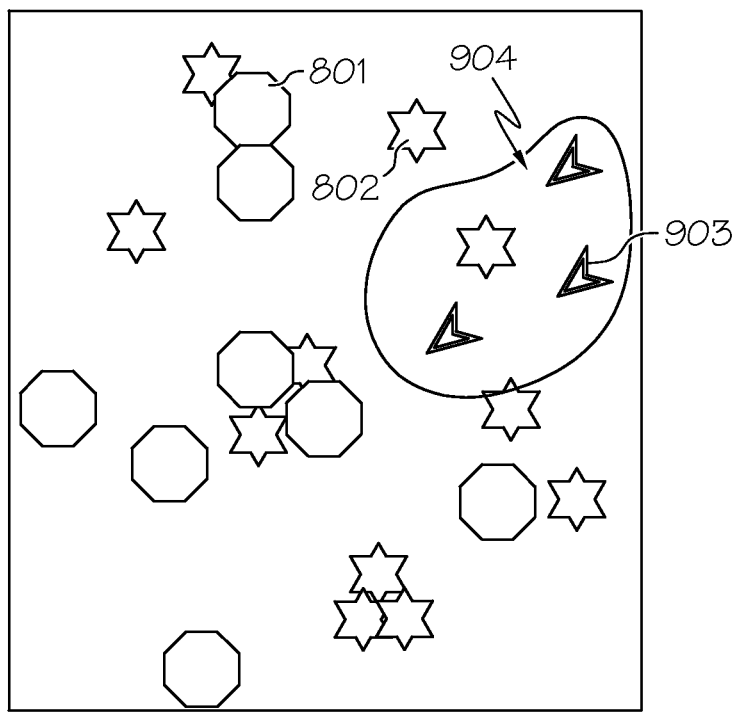

In another example, FIGS. 9a and 9b depict a rule based display or layer rendering application of the mask. The mask can be used to specify display rendering rules for a specific display region. The display rendering rule would be applied only to the display portion covered by the mask as dynamically specified by the user either through gesture or through predefined regular geometrical shapes. The display rendering rules can be either statically configured or mentioned dynamically through corresponding user interface. FIG. 9a depicts a display without display rendering rules applied. FIG. 9b shows that the addition of one more layers that might increase the objects displayed (objects 903). The user can use the mask 904 to specify a display region where he/she wants a specific display rendering or layer activation.

Figure 10A:
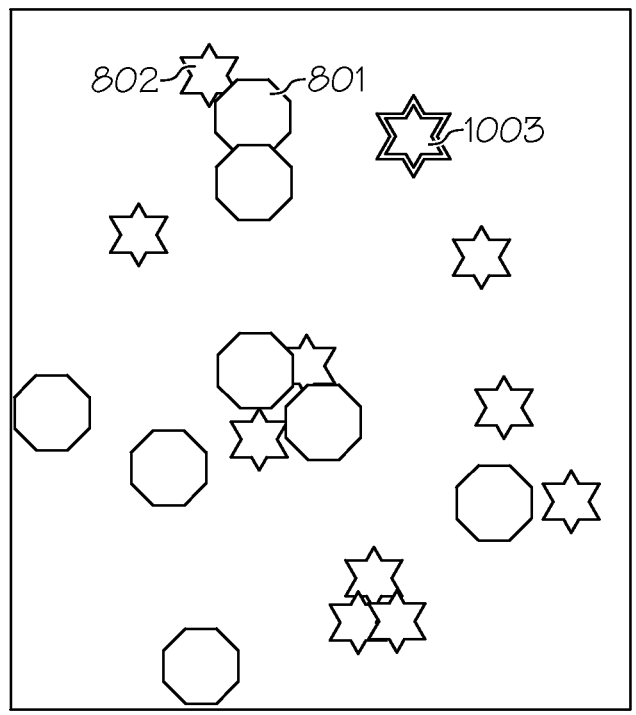
FIGS. 10a-b illustrate the use of a virtual mask in a protected control application.
Figure 10B:
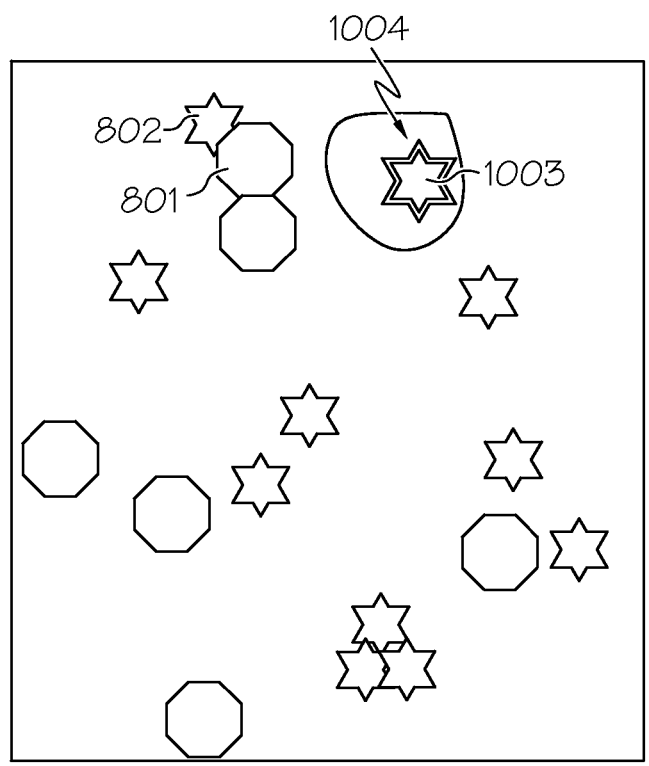

In another example, FIGS. 10a and 10b depict an exemplary application of the rule-based mask for rule based display interactivity. In this case special or protected control functions are accessible to users only when the graphical element is covered by the mask having its rule configured for allowing special interaction. The mask can be used for specifying interactivity rules for a specific display region containing interactive elements. This capability dynamically augments the statically defined interactivity capabilities of a graphical element, making the display interactivity extensible dynamically. That is, graphical elements' interactivity can be dynamically morphed. For example, a "normal button" object can be made to behave as "toggle button" if it is covered by the mask and if the corresponding rule specifies to change the interactivity of "normal button" to "toggle button." FIG. 10a shows the regular control function. In comparison, FIG. 10b shows the special/protected control function with the mask 1004 overlaid over object 1003.

Certain interaction rules have been described above using the examples of virtual keyboard implementations, aviation implementations, and others. However, the present disclosure is broadly directed to a rule-based masking system and method that enables or limits a function on a touch screen display device to improve user experience, reduce interaction errors, and improve accuracy. The interaction rules described herein can be designed by a developer or a user to suit the needs of any implementation on which the novel system and methods presented herein are employed. Provided below are even more examples of interaction rules that can be implemented on any given touch screen device, as may be desired by a developer or a user.

In one non-limiting example of a rules-based interaction in accordance with the present disclosure, a touch screen display does not mandate the user to provide continuous touches for data entry. The touch screen display employs a novel method where, for a particular input to be entered, the user stops traversing the display over an individual region on the touch screen display corresponding to an object corresponding to a desired input. This ensures reduced input entry errors improving the entry consistency, accuracy, and speed. As used herein, the user's action where the touch screen display traversing is stopped is referred to herein as "hovering." As such, if the user hovers over a graphical item for a preconfigured duration, a "selection," i.e., indication of character entry, or an appropriate preconfigured event is registered.

In another non-limiting example of a rules-based interaction in accordance with the present disclosure, a touch screen display does not use standard system buttons, keys, symbols, characters, or objects (and others) that associate a static behavior to the individual buttons, keys, symbols, characters, or objects. Examples of such static behavior include, but are not limited to: a letter being associated solely with individual object; the visual, tactile and aural feedback characteristics of the object; and more importantly; and further the touch sensitive area associated with a system or custom object. Since, these properties are disassociated from the visual objects, the presently disclosed touch screen display offers very flexible and dynamic and rules-based control of these properties employing the masking concept presented herein.

In a further non-limiting example of a rules-based interaction in accordance with the present disclosure, a touch screen display system implementation requires only CPU processing as compared to other touch screen display systems that are known in the art. That is, as the presently disclosed touch screen display is based on simple rules that use system functions, rather than complex background pattern processing and like, the battery life of the host device is not significantly reduced.

In yet another non-limiting example of a rules-based interaction in accordance with the present disclosure, a touch area is increased based on location of input key (or other object) or touch event on the screen. This feature provides an improved user experience for the regions where touch screen hardware provides reduced touch active area (e.g. regions in proximity of screen corners) and for regions near the periphery of the keyboard where touch accuracy decreases. Broadly speaking, an increased size of the effective touch active region results in an increased likelihood of touch. Further, the varied touch active region across the touch screen surface based on the location around the screen improves touch accuracy and reduces entry errors, improving overall data entry accuracy.

In yet another non-limiting example of a rules-based interaction in accordance with the present disclosure, a touch screen display user interface also employs novel touch combination and gesture inputs that remove the necessity of having dedicated modifier keys (or object). In this example, it is convenient to refer to the example embodiment of a keyboard interface, however it will be appreciated that this exemplary concept will apply to other applications. For example, in the embodiment of a keyboard, the "SHIFT", "ALT", "SYMBOLS", "SPACE", "DELETE," etc., dedicated modifier keys would not be required. This feature not only provides intuitive usability improvements for each type of modifier action, but also increases the effective touch screen area for primary keys or objects, depending on the particular implementation.

In yet another non-limiting example of a rules-based interaction in accordance with the present disclosure, an advantage of having rule based interaction feedback is that, it is possible to provide different interaction feedbacks for different user interface elements of same class. For example, again referring to the non-limiting example of a virtual keyboard implementation, it is possible to have more distinct aural/visual/tactile feedback for special keys like 'ENTER', 'DELETE' than regular character keys as may be found in the prior art.

Still further, in another non-limiting example of a rules-based interaction in accordance with the present disclosure, the touch screen display user interface employs aural and visual keys to the user to indicate the occurrence of a touch event, based on a rules engine associated with the rules-based masking system as set forth in greater detail herein. This feature increases the likelihood of successful input based and fulfills a long-felt need in the art related to lack of haptics that a physical input device would otherwise offer a user.

It will be appreciated that a particular advantage of the above-described embodiments is that the possibility of inadvertent touch on the touch panel is decreased by adding appropriate interaction "rules." This advantage, in one example implementation, is relevant to aviation touch panels (i.e., as may be implemented in the cockpit of an aircraft) due to the unstable nature of the platform (turbulence, aircraft maneuvers, etc.). Other implementations will be appreciated by those having ordinary skill in the art.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A method of touch-based user interaction with a touch screen device implemented as an aircraft cockpit display in an aircraft, comprising:
   receiving, from one or more of a terrain database of the aircraft, a navigation database of the aircraft, or sensors implemented on the aircraft, data representing one or more of terrain information, navigation information, and aircraft-sensed information to be displayed on the touch screen device;
   in response to the step of receiving, displaying, on the touch screen device as a plurality of virtual objects, the one or more of terrain information, navigation information, and aircraft-sensed information, wherein the displayed one or more of terrain information, navigation information, and aircraft information is displayed as a virtual object that represents the received one or more of terrain information, navigation information, and aircraft information;
   by touching the touch screen device, defining a region of the touch screen device over which to provide a virtual mask, wherein the step of defining the region comprises initiating touching the touch screen device at a first location and continuing touching the touch screen device along a path from the first location to a second location that is a distance from the first location, the path being a geometric shape along the touch screen device that includes both the first location and the second location;

based on the step of touching, providing the virtual mask overlaying an entirety of two or more of the plurality of virtual objects on the touch screen device and defining a mask area in accordance with the defined region, wherein the mask area corresponds with an enclosed area of the geometric shape and is bounded by at least the first location and the second location, and wherein the two or more of the plurality of virtual objects remain visible on the touch screen device through the overlying virtual mask, wherein the mask area encompasses only a portion, but not an entirety of the touch screen device, wherein the two or more of the plurality of virtual objects comprise a first object of a first type and a second object of a second type, wherein on the touch screen device outside of the mask area, a third object of the second type is displayed;

removing from the touch screen device at least one of the two or more of the plurality of virtual objects, the removed at least one object having been within the mask area, the removed object being the second object of the second type, wherein at least one object remains within the mask area after removing the at least one of the two or more of the plurality of virtual objects, the remaining object being the first object of the first type, wherein the third object of the second type outside of the mask area is not removed;

sensing a touch within the mask area, the touch generating a touch data signal; and applying one or more interaction rules to the touch data signal.

2. The method of claim 1, further comprising providing a feedback data signal to the touch screen device.

3. The method of claim 2, further comprising applying one or more interaction rules to generate the feedback data signal, and wherein the feedback data signal causes the touch screen device to generate one or more of a visual, a tactile, and an aural feedback response.

4. The method of claim 1, wherein the interaction rules are not applied when the touch occurs outside of the mask area.

5. The method of claim 1, wherein the one or more rules are user defined or developer defined.

6. A touch screen device implemented as an aircraft display in the cockpit of an aircraft, comprising:

a display screen;

first circuitry configured to receive, from one or more of a terrain database of the aircraft, a navigation database of the aircraft, or sensors implemented on the aircraft, data representing one or more of terrain information, navigation information, and aircraft-sensed information to be displayed on the touch screen device;

second circuitry configured to display the one or more of terrain information, navigation information, and aircraft-sensed information as at least two virtual objects through the display screen, wherein the displayed one or more of terrain information, navigation information, and aircraft information is displayed as a virtual object that represents the received one or more of terrain information, navigation information, and aircraft information; and third circuitry configured to sense touches applied to the at least two virtual objects; and a processor configured to:

by receiving a touch to the display screen, define a region of the display screen over which to provide a virtual mask, wherein defining the region comprises initiating touching the touch screen device at a first location and continuing touching the touch screen device along a path from the first location to a second location that is a distance from the first location, the path being a geometric shape along the touch screen device that includes both the first location and the second location;

provide a virtual mask overlaying an entirety of the at least two virtual objects and defining a mask area, wherein the mask area corresponds with an enclosed area of the geometric shape and is bounded by at least the first location and the second location, and wherein the two or more of the plurality of virtual objects remain visible on the touch screen device through the overlying virtual mask, wherein the mask area encompasses only a portion, but not an entirety of the touch screen device, wherein the two or more of the plurality of virtual objects comprise a first object of a first type and a second object of a second type, wherein on the touch screen device outside of the mask area, a third object of the second type is displayed;

remove from the touch screen device at least one of the at least two virtual objects, the removed at least one object having been within the mask area, wherein at least one object remains within the mask area after removing the at least one of the at least two virtual objects, the remaining object being the first object of the first type, wherein the third object of the second type outside of the mask area is not removed;

sense a touch within the mask area, the touch generating a touch data signal; and apply one or more interaction rules to the touch data signal.

7. The device of claim 6, wherein the processor is further configured to provide a feedback data signal to the touch screen device.

8. The device of claim 7, wherein the feedback data signal causes the touch screen device to generate one or more of a visual, a tactile, and an aural feedback response.

9. The device of claim 7, wherein the interaction rules are not applied when the touch occurs outside of the mask area.

10. The device of claim 7, wherein the one or more rules are user defined or developer defined.

11. A method of touch-based user interaction with a touch screen device implemented as an aircraft cockpit display in an aircraft, comprising:

receiving, from one or more of a terrain database of the aircraft, a navigation database of the aircraft, or sensors implemented on the aircraft, data representing one or more of terrain information, navigation information, and aircraft-sensed information to be displayed on the touch screen device;

in response to the step of receiving, displaying, on the touch screen device as a plurality of virtual objects, the one or more of terrain information, navigation information, and aircraft-sensed information, wherein the displayed one or more of terrain information, navigation information, and aircraft information is displayed as a virtual object that represents the received one or more of terrain information, navigation information, and aircraft information;

by touching the touch screen device, defining a region of the touch screen device over which to provide a virtual mask, wherein user gestures upon touching the touch screen device dynamically draw the region to a shape corresponding with the user gestures, and wherein the step of defining the region comprises initiating touching the touch screen device at a first location and continuing touching the touch screen device along a path from the first location to a second location that is a distance from the first location, the path being a geometric shape along the touch screen device that includes both the first location and the second location;

based on the step of touching, providing the virtual mask overlaying an entirety of a first one of the plurality of virtual objects on the touch screen device and defining a mask area in accordance with the defined region, wherein the mask area corresponds with an enclosed area of the geometric shape and is bounded by at least the first location and the second location, and wherein the first one of the plurality of virtual objects remains visible on the touch screen device through the overlying virtual mask, and wherein a second one of the plurality of virtual objects on the touch screen device is not within the mask area, and wherein the first one and the second one of the plurality of virtual objects are the same type of virtual object;

sensing a first touch within the mask area corresponding to a touch of the first one of the plurality of virtual objects, the first touch generating a first touch data signal;

applying a first touch interaction rule to the first touch data signal that causes a first type of action to be performed with regard to the first one of the plurality of virtual objects;

sensing a second touch outside of the mask area corresponding to a touch of the second one of the plurality of virtual objection, the second touch generating a second touch data signal that is different than the first touch data signal; and applying a second touch interaction rule to the second touch data signal that causes a second type of action to be performed with regard to the second one of the plurality of virtual objects, wherein the second type of action is different than the first type of action even though both the first and second ones of the plurality of virtual objects are of the same type of virtual object, wherein after applying both the first and second touch interaction rules, both of the first and second ones of the plurality of virtual objects remain visible on the touch screen device.

12. The method of claim 1, wherein user gestures upon touching the touch screen device dynamically draw the region to a shape corresponding with the user gestures.

13. The device of claim 6, wherein user gestures upon touching the touch screen device dynamically draw the region to a shape corresponding with the user gestures.

14. The method of claim 1, further comprising, prior to the step of defining the region, configuring a de-cluttering rule or a de-cluttering filter in a dynamic manner using a user interface, wherein the de-cluttering rule or the de-cluttering filter defines the manner in which the removing step is performed.

* * * * *